F. RANSOM.
Churn.

No. 69,248.    Patented Sept. 24, 1867.

Witnesses,

Inventor,
Franklin Ransom
By J. Fraser & Co
Attys

United States Patent Office.

FRANKLIN RANSOM, OF BUFFALO, NEW YORK.

Letters Patent No. 69,248, dated September 24, 1867.

IMPROVEMENT IN CHURN-DASHERS.

The Schedule referred to in these Letters Patent and making part of the same.

TO ALL WHOM IT MAY CONCERN:

Be it known that I, FRANKLIN RANSOM, of Buffalo, in the county of Erie, and State of New York, have invented a certain new and useful Improvement in Dashers for Churning, Agitating Oil, &c.; and I do hereby declare that the following is a full and exact description thereof, reference being had to the accompanying drawings, making part of this specification.

Figure 1:
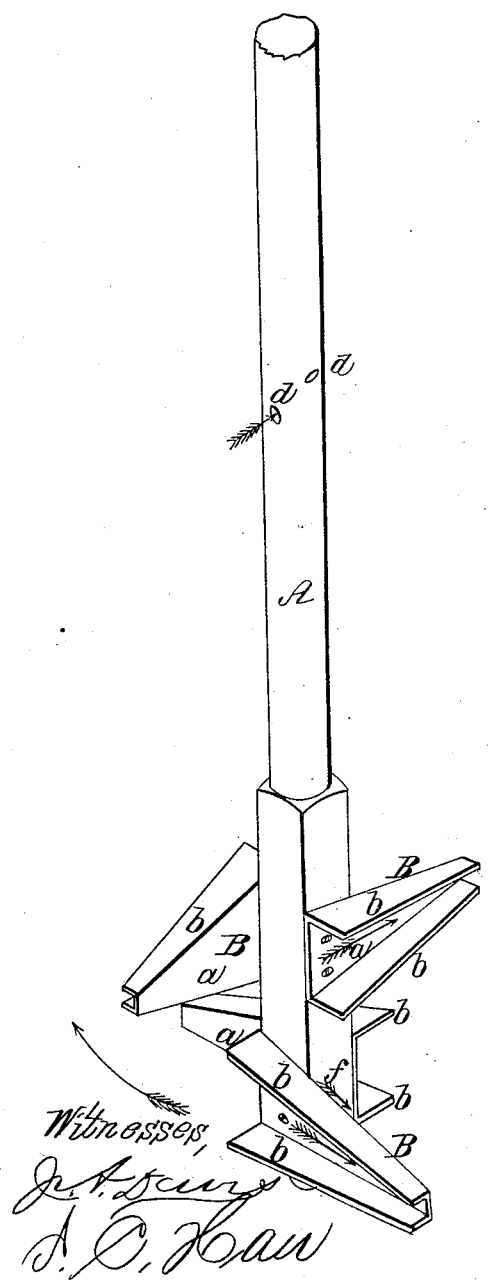

Figure 1 is a perspective view of my improved dasher.

Figure 2:
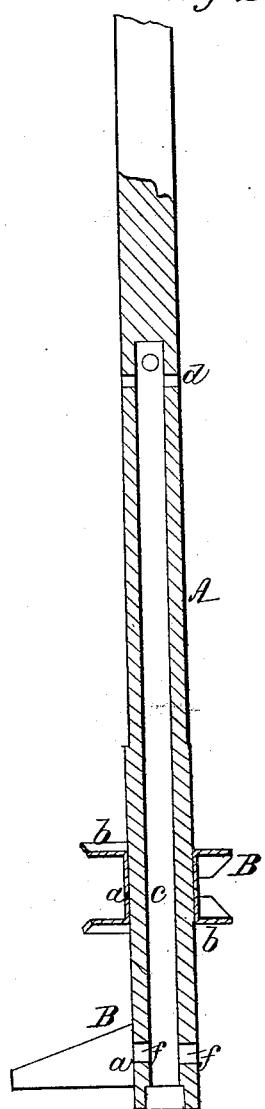

Figure 2, a vertical section of the same.

Like letters of reference indicate corresponding parts in both figures.

My invention consists in forming the dasher with a series of wings, in the form of spouts or troughs, whose sides converge outwardly, so as to compress or concentrate the liquid as it is thrown out by the centrifugal action, and discharge it in small streams with great force, the said wings being also capable of being set at different angles to vary the direction of the streams. It further consists in combining with these wings, thus constructed, a hollow dasher-rod, with outlets at the bottom opening directly in the rear of the wings, so as to discharge the air into the wake or space left by the passage of said wings, as hereinafter set forth.

As represented in the drawings, A is the dasher-rod, having attached at the bottom, wings B B, which form the dasher. These wings are in the form of spouts or troughs, but turned sidewise, having bottoms $a\ a$, and sides $b\ b$, which latter converge as they extend outward, as shown. The wings may be attached by screws or otherwise. I prefer to set them at different angles, so as to force the streams in different directions to produce a more thorough agitation by the commingling of the currents. The great advantage of this arrangement is, that the liquid at the centre entering the open or enlarged end of the wings is gradually compressed as it passes outward by the centrifugal action, and is dashed with great violence against the sides and bottom of the vessel, and the wings, when set at different angles, produce such a commingling and opposing of the currents as to most effectually agitate the mass. In churning, especially, this arrangement is found of the greatest advantage, for, not only is the desired agitation produced, but the compression of the cream in the converging troughs has the effect to thoroughly and expeditiously break the globules by pressure as well as by friction. This effect can be produced in no ordinary churn.

It will be noticed that the construction is very simple and cheap, as the wings are preferably made by simply bending pieces of sheet metal and screwing them to the rod, although they may be formed of any other suitable material. I make the lower end of the dasher-rod tubular, a suitable length, as shown at $c$, having induction holes $d\ d$ at the top for the admission of air, and eduction outlets $f\ f$ at the bottom for allowing it to pass into the liquid. The outlets $f\ f$ are situated directly in the rear of the wings, in such position as to cause the air to discharge into the wake or space formed by the wings in their passage. By being thus situated directly in the rear of the wings, the air is enabled to pass into the space before the liquid can close up, and therefore the air is most thoroughly brought in contact with the liquid. The form and construction of the dasher require comparatively but little power to drive it. In agitating large bodies of liquid, oil for instance, the saving of power over ordinary agitators is considerable. This dasher produces a greater agitation with less power than any other device for the same purpose with which I am acquainted.

What I claim as my invention, and desire to secure by Letters Patent, is—

1. Forming the dasher with a series of wings in the form of spouts or troughs, with the sides converging outward in the manner and for the purpose set forth, said wings being capable of standing in different angles, as described.

2. The combination and arrangement, with the wings thus formed, of the tubular rod, with the outlets $f\ f$ opening directly in the rear of the wings, as herein set forth.

In witness whereof I have hereunto signed my name in the presence of two subscribing witnesses.

FRANKLIN RANSOM.

Witnesses:
 JAY HYATT,
 ALBERT HAIGHT.